United States Patent [19]

Barnaby

[11] 3,982,064

[45] Sept. 21, 1976

[54] COMBINED TELEVISION/DATA TRANSMISSION SYSTEM

[75] Inventor: Bernard Sydney Barnaby, Ware, England

[73] Assignee: The General Electric Company Limited, London, England

[22] Filed: Sept. 5, 1974

[21] Appl. No.: 503,376

[30] Foreign Application Priority Data

Sept. 4, 1973 United Kingdom............... 41445/73

[52] U.S. Cl. ................................................. 178/5.6
[51] Int. Cl.² .......................................... H04N 7/00
[58] Field of Search............... 178/5.6, 5.8, DIG. 23, 178/69.5 R, 69.5 TV, 6, 6.8; 340/324 AD, 33

[56] References Cited
UNITED STATES PATENTS

| | | | |
|---|---|---|---|
| 3,345,458 | 10/1967 | Cole et al. ............................ | 178/6.8 |
| 3,491,199 | 1/1970 | Weinstein ............................. | 178/5.6 |
| 3,493,674 | 2/1970 | Houghton ............................ | 178/5.6 |
| 3,575,554 | 4/1971 | Schmidt ........................ | 178/69.5 R |
| 3,792,443 | 2/1974 | Breikss............................ | 178/69.5 R |
| 3,848,082 | 11/1974 | Summers ............................. | 178/5.6 |

*Primary Examiner*—Robert L. Griffin
*Assistant Examiner*—John C. Martin
*Attorney, Agent, or Firm*—Kirschstein, Kirschstein, Ottinger & Frank

[57] ABSTRACT

A television transmission system of the kind in which some of the line scan periods of a conventional transmission that are left blank (as far as picture content is concerned) between successive frame transmissions are utilized for signalling data for selective display on the screen of a television receiver. The improvement over previous systems is that the information to be displayed as a line of data may be transmitted in a single line scan period. This is achieved by transmitting in a line scan period a page number and then in subsequent line scan periods the lines of data for that page. New page numbers are then transmitted followed by their respective lines of data in sequence. A receiver for the transmission system is described.

7 Claims, 2 Drawing Figures

COMBINED TELEVISION/DATA TRANSMISSION SYSTEM

CROSS-REFERENCE TO RELATED APPLICATION

This application is related to co-pending application Ser. No. 503,172 filed Sept. 4, 1974 for COMBINED TELEVISION/DATA RECEIVERS by Bernard Sydney Barnaby and Donald Gordon Scott.

BACKGROUND OF THE INVENTION

1. Field of the invention.

This invention relates to television systems.

In the type of television signal currently broadcast within the United Kingdom, there is a period between transmission of the last line of each picture frame and the beginning of the first line of the next frame in which no picture information is sent. This period has a duration approximately equal to that of twenty five lines. The first part of the period is taken up by a predetermined pulse waveform which includes frame synchronising pulses and the latter part (for a duration of eight lines) consists solely of line synchronising pulses, i.e., in this second part the waveform is the same as that during picture transmission except that there is no picture information between the line synchronising pulses. These blank lines can be considered as representing a margin at the top of the picture that is displayed on the screen of a conventional television receiver.

It has recently been proposed to utilise one or more of these blank lines in each frame to transmit selected items of data which can be displayed on the screen of a television receiver either in addition to or in place of the normal television picture. A system that is capable of handling both picture information and data that is transmitted in blank lines of the picture is hereinafter referred to as a "combined television/data system".

It is convenient to identify the data that can be displayed at any one time as a page by which term is subsequently referred to herein. The particular page displayed of those pages of data being transmitted is selected by operation of a suitable control of equipment forming part of or associated with the televison receiver.

Each line of data within a page is hereinafter referred to as a data line. In fact the display of each data line involves a plurality of line scans of the cathode ray tube or other display device of the television receiver. Combined television/data systems of the kind with which the present invention is concerned, rely on each character to be displayed being characterised in digital, preferably binary, form and accordingly the equipment mentioned in the last paragraph includes a plurality of character generators which are each arranged selectively to supply the appropriate modulating signals to the display device during a succession of line scans to cause the required character to be displayed.

In view of the limited amount of data that can be transmitted during each picture frame, it is necessary for the equipment forming part of or associated with a television receiver for the purpose of displaying data to have provision for storing at least the page of data that is required to be displayed. Such storage is periodically updated but, for this to be done satisfactorily, it is clearly essential for the equipment to be able to identify in some way the data received during each picture frame.

2. Description of Prior Art.

In the proposed arrangements previously referred to, it has been thought necessary for the address information transmitted with the required data in the otherwise blank lines to include the page identification in each picture frame. Thus in one arrangement, two adjacent blank lines in a frame are utilised to signal one data line, the first of these blank lines containing the identity (in digital form) of the page and data line and the first half of the character of the data line while the second blank line carries the characters of the second half of the data line. In another arrangement one blank line in each of four successive frames is utilised to signal each data line, each such blank line carrying details of one quarter of the characters that make up the data line prefaced by the identity of the page, the data line and the particular quarter of the data line.

It has now been realised that it is not necessary to effect such complete addressing of the data signalled in each picture frame and that, as a result, it is possible for a single blank scan line to be used for signalling a complete data line.

SUMMARY OF THE INVENTION

The invention therefore provides a television/data transmission system, and a transmitter for such a system, in which each data line is transmitted during a single line scan period during the vertical blanking interval. This is accomplished by firstly transmitting a line which identifies the page number, a receiver such as described herein being synchronised by this line. Then in subsequent vertical blanking intervals a complete data line is transmitted with only a start signal and a line address. The lines for any page are therefore transmitted and then a new page is transmitted.

BRIEF DESCRIPTION OF THE DRAWINGS

The television system according to the present invention will now be described and apparatus for the system will be described with reference to the accompanying drawings in which.

DESCRIPTION OF THE PREFERRED EMBODIMENTS

Figure 1:
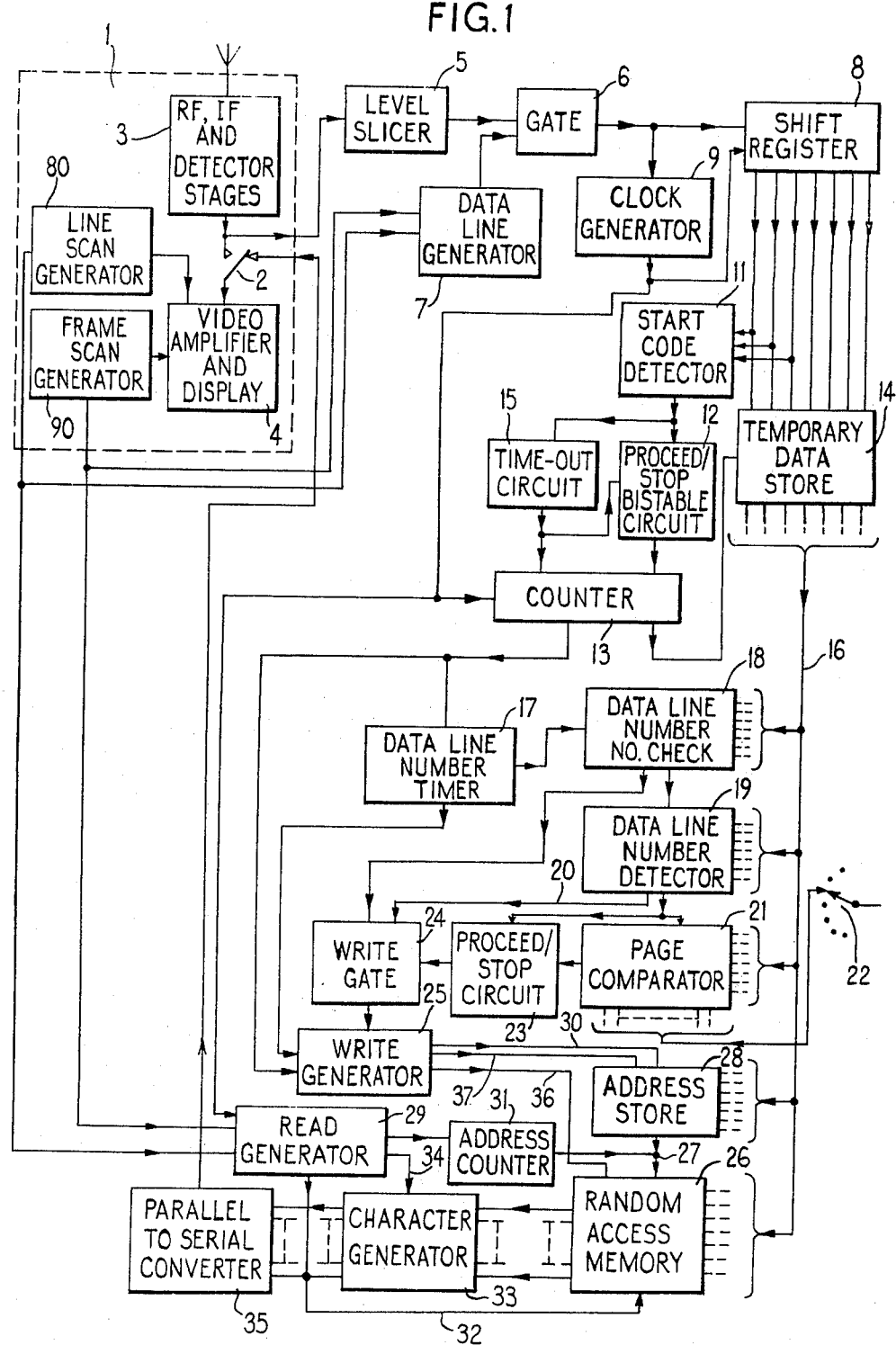
FIG. 1 shows diagrammatically one possible form of receiver.

With the standard 64 micro-second line scan interval, it has been found that a character rate frequency of 1.03125 MHz is satisfactory. (At forty characters a line, this allows some time for fly-back.) Each character is displayed in 7 × 5 matrix and allowing one space (in the direction of line scan) between characters, this gives a basic bit frequency of six times the character rate frequency, namely 6.1875 MHz.

The maximum number of bits transmitted in any one line scan interval is 319 so that the actual time utilised within a line scan interval for the purpose of signalling data to be displayed is only 51.5 micro-seconds.

In the transmitted television signal, the several pages of data are signalled cyclicly utilising in each picture frame one line scan interval that is not used for carrying picture information i.e., a blank line scan. Considering now any such page, one blank line scan interval is utilised primarily for giving the page address but not identifying any of the actual data to be displayed. For this purpose the binary information actually transmitted may consist of the following groups of digits in sequence and at the basic bit frequency previously mentioned:

a. Ten bits having the pattern 1010101010. (At the receiver equipment to be described hereinafter with reference to the drawing, this pattern is used as a run-in to synchronise a clock generator operating at the basic bit frequency.)

b. Three bits having the pattern 110. (This pattern is recognised by the receiving equipment as a "start" code.)

c. Fourteen bits identifying a characteristic data line (for example 11111 representing line 31) other than any one of the required twenty four data lines that are subsequently to be addressed. To enable checks to be made by the receiving equipment that this line number has not been wrongly received and remembering that only five binary digits are really needed to identify this line, the fourteen bits may be made up as follows:

1. The five bits of the data line address,
2. An odd parity bit,
3. An even parity bit,
4. Seven bits that are the binary complement of (1), (2) and (3) but in the reverse order.

d. A group of bits identifying the page number again with redundancy to enable the decoding equipment to check the accuracy of transmission. If there are only thirty-one page numbers to be identified, fourteen bits may be used as in (c).

e. Twenty-eight bits characterising the current time, half of these bits defining the hour and the rest defining the minutes. Coding of each of the hours and minutes may have the same security format as (c) above.

f. A group of digits characterising special instructions to the receiving equipment.
Examples of this are given below:
Captions and news flashes
Graphic or alpha-numeric display
General reset (i.e., cancelling all data stored in the receiving equipment store)

g. Twelve bits selected to enable a cyclic redundancy check to be effected by the receiving equipment.

The corresponding blank line scan intervals of successive frames are each utilised to contain information characterising the whole of one data line together with the address of that data line. More particularly, the binary information transmitted in each such line scan interval is as follows:

a. As (a) and (b) above
b.
c. As (c) above except that the appropriate data line address is used.
d. Up to 280 bits to characterise a maximum of 40 characters to be displayed i.e., each character is represented by seven bits.
e. Twelve bits selected to enable a cyclic redundancy check to be effected as in (g) above.

It will be appreciated that it is only necessary to signal information in respect of those data lines that are actually to be displayed. Thus, if there are only ten data lines in a particular page, the complete page (together with the page identification) may be transmitted in eleven picture frames. Whenever information is received in respect of a particular data line, the characters stored in the receiving equipment store for that line are automatically erased and replaced by new characters. In general there is no need to retransmit information in respect of a data line that is not to be changed in the display. However it is convenient for transmission of all data lines of a page (i.e., in corresponding line scan intervals in twenty-five successive picture frames) to be made periodically so that the stored data (assuming the page in question is being displayed) is completely up-dated and spurious characters eliminated.

Referring now to the drawing, the receiving system to be described includes a monochrome television receiver 1 which, apart from the provision of a change-over switch 2, is quite conventional. In fact, when the switch 2 is in the alternate position to that shown in the drawing, the video frequency signal supplied by the preceding stages 3 is passed to the amplifier and display unit 4 so that a television picture is presented on the screen of the cathode ray tube (not shown) of the unit 4 in the usual way. A transmitted signal is received by the aerial A and passed to the RF, IF and detector stages 3.

The video frequency signal supplied by the stages 3 is also passed through a level slicer 5 to a gate 6, the slicer 5 being arranged to improve the signal-to-noise ratio of at least that part of the video frequency signal containing information relevant to the data display, i.e., in the appropriate blank line scan periods. A generator 7 also supplies a gating signal to the gate 6 during each such period so that the gate 6 periodically supplies a binary signal that carries all the transmitted information associated with data that may be displayed. Timing of the generator 7 is controlled by signals supplied by the line and frame scan generators 80 and 90 of the receiver 1.

The binary signal supplied by the gate 6 is passed to a seven-bit shift register 8 together with shift pulses which are supplied by a clock generator 9 and which have a pulse recurrence frequency equal to twice the data bit rate. The generator 9 is synchronised by the binary signal supplied by the gate 6, it being remembered that the first ten bits of such a signal are provided solely for the purpose of bringing the generator 9 into synchronisation before other information is signalled.

Signals representing the three digits stored at any time in the first three stages of the shift register 8 are supplied to a detector 11 which is arranged to respond to receipt of the start code (e.g., the bit pattern '110'). Upon the start code being detected, a signal is supplied to trigger a bistable circuit 12 to its proceed state. This in turn causes an enabling signal to be fed to a seven-stage cyclic counter 13 which is arranged to count clock pulses supplied by the generator 9. As each group of seven bits after the start code is stored in the shift register 8, the counter 13 supplies a signal to a store 14 to cause the group of bits then stored by the register 8 to be written into the store 14 and to be temporarily stored thereby. Thus each group of seven bits received during a television line scan interval after the start code is stored in turn by the store 14. The signal supplied as aforesaid by the detector 11 when the start code is identified is also utilised to start a timing operation by a circuit 15 and, at the end of the line scan interval, the circuit 15 supplies a signal to inhibit further operation of the counter 13 and to reset the bistable circuit 12 to its 'stop' state.

The sequence of operations so far described is carried out during each blank line scan period of the transmitted signal that is utilised for data signalling regardless of whether the information transmitted in such a period is primarily concerned with a page address or with a data line for display. Furthermore it is carried out quite irrespective of the particular page selected (as hereinafter described) for display.

Signals characterising the group of seven bits stored at any time by the temporary store 14 are supplied respectively over a group of leads represented in the drawing by a single line 16. (These leads are subsequently referred to as the leads 16.)

For ease of description, it will now be assumed that only seven bits are utilised to identify a page and another seven bits to identify a data line within a page. (In the arrangement described in the previous specification fourteen bits were used for each of these purposes.)

A signal supplied by the counter 13 causes a timer circuit 17 to operate, the circuit 17 supplying a signal to a check circuit 18 a predetermined period after the receipt of the 'start' code when signals characterising the first group of bits received after the 'start' code should be present on the leads 16. The circuit 18 carries out parity and other checks on these signals to ascertain whether or not they have been correctly received. If they have, an enabling signal is passed to a detector 19 which is arranged to respond to signals on the leads 16 characterising the data line address that signifies that a page number is to follow.

Assuming now that the detector 19 does respond in the manner just stated, a signal is supplied by that detector to a comparison circuit 21. When signals characterising the page number appear on the leads 16, the circuit 21 is arranged to compare these signals with an equal number of signals that are supplied in parallel by a page-selecting switch 22 to represent in digital form the position of that switch and hence identifying the page of data to be displayed. (Although not shown in the drawing, a circuit, similar to the check circuit 18, may be provided to check the accuracy of the received page number before proceeding with comparison by means of the circuit 21.) Upon the comparison circuit 21 having ascertained that the page then being transmitted is the one to be displayed, a signal is supplied to trigger a bistable circuit 23 to its proceed state.

When the circuit 23 is in its proceed state, an enabling signal is passed through a gate 24 to a generator 25 which is arranged subsequently to supply a sequence of signals to control the writing of received data into a random access memory 26. The memory 26 may comprise a multiplicity of M.O.S. transistors, and may conveniently be of integrated circuit form. Since each character to be stored is represented by a group of seven bits in respect of which signals are caused to be present simultaneously on the leads 16, the memory 26 may consist of seven sub-memories each of which is associated with a respective one of the leads 16, corresponding storage locations in the seven sub-memories having the same multi-digit address as signified by signals supplied in parallel (over a group of leads represented by a line 27) by an address store 28.

It will be appreciated that the circuit 23 is triggered to its proceed state during one line scan period while information in respect of data lines of the page in question is transmitted in corresponding line scan periods of subsequent fields of the television picture. The generator 25 is prevented from being brought into operation during the first such period by an inhibiting signal supplied by the detector 19 over a lead 20. During each subsequent period, the counter 13 and the timing circuit 17 are brought into operation in the manner previously described and signals supplied thereby are utilised to initiate and control operation of the generator 25. On each of these occasions, the generator first supplies a signal over a lead 30 to the address store 28 at the appropriate time to cause the number of the data line represented by signals on the leads 16, to be stored thereby. (The accuracy of this number is again checked by the circuit 18 and, in the event of it having been incorrectly received, an inhibiting signal is passed to the gate 24 so as to discontinue operation of the generator 25.) When the signals on the leads 16 are in respect of the first character to be stored in the memory 26, a write signal is supplied by the generator 25 over a lead 36 to cause the binary representation of that character to be written into the memory 26 at the storage location identified by address signals then supplied over the leads 27. The generator 25 then supplies a signal over a lead 37 to increment the address store 28 and, at the appropriate time, another write signal is passed to the memory 26 to cause the second character to be stored. This procedure is repeated until all forty characters of the data line in question have been stored by the memory 26, this operation being completed during the television line scan period in which information characterising that data line is transmitted.

It will be appreciated that if information is being signalled in respect of a complete page of 24 data lines, the corresponding line scan intervals of 25 successive television fields are used for that purpose. If however a page has a lesser number of data lines at any time, there may be a corresponding reduction in the number of television fields needed for that purpose. The operation of writing characters into the memory 26 in respect of any particular data line, automatically overwrites (i.e., replaces) any characters already stored in the storage locations relevant to that data line.

When a transmission of a particular page has been completed, the next corresponding line scan interval contains information in respect of the next page address. At that time, detector 19 again supplies a signal which is utilised to trigger the bistable circuit 23 to its stop state thereby inhibiting operation of the generator 25. The signal supplied by the detector 19 also causes the comparator 21 to check the page identity but, since that address is not of the page selected by the switch 22, the circuit 23 is not re-triggered to its proceed state. It follows therefore that the subsequent transmission of information in respect of data lines of pages other than the selected page have no effect on the characters stored in the memory 26.

Although it has been assumed in the above description that the identity of a page and of a data line are each provided by only seven bits, it will be appreciated (as described in the prior specification) that fourteen bits are used for each of these purposes. To handle these longer addresses, it is merely necessary for the circuit 18, the detector 19 and the comparison circuit 21 each to be adapted to respond to two successive groups of signals (each such group being in respect of seven bits) supplied over the group of leads 16.

The characters stored by the random access memory 26 at any time are displayed on the screen of said cathode ray tube under the control of a signal generator 29. Timing of operation of the generator 29 is achieved by signals supplied by the line and frame scan generators 8 and 9.

At the commencement of a display frame, the storage locations within the memory 26 associated with the first character of the first data line is addressed by means of signals supplied by an address counter 31 over the group of leads represented by the line 27. The generator 29 supplies a read signal to the memory 26 over a lead 32 as a result of which a group of seven signals identifying the character in question are passed in parallel to a character generator 33.

The character generator 33 is of known form and is arranged to supply in parallel a group of six signals each of which corresponds to one dot in that portion of a display line scan associated with the character identified by the signals supplied by the memory 26. (Strictly speaking only five signals are required for this purpose since the sixth one always represents a space between adjacent characters.) Each character displayed may extend over twenty adjacent lines in the display and since the group of dots for a character will, in general, differ from bit to line, it is necessary for the scan line concerned at any time to be identified by signals supplied by the generator 29 over a group of leads represented by a line 34. (To provide a space between each adjacent pair of lines of dots in the display, six of these scan lines are always blank so that the character generator 29 is only required to deal with fourteen scan lines for each line of data. Furthermore, with conventional interlaced scanning, it has been found satisfactory for the signals representing groups of dots in the seven scan lines of one field to be repeated during the interlaced scan lines of the next field.)

Reverting now to the first character of the first data line that has been read from the memory 26, the character generator 33 supplies to a parallel-to-series converter 35 the appropriate signals corresponding to the dot pattern of the first scan line of the character in question. The converter 35 changes those signals from parallel to series form and the resulting video signal is passed through the switch 2 to the unit 4.

After the first character of the first data line has been so read, the address counter is incremented by a signal from the generator 29 so as to cause the storage location of the memory 26 associated with the second character of the first data line to be addressed. The generator 29 then supplies another read signal to the memory 26 so that, by way of the character generator 33 and the converter 35, the second character is displayed in so far as the first scan line is concerned. This process of alternately incrementing the counter 31 and reading the addressed character from the memory 26 is continued until the whole of the first data line has been read.

The address counter 31 is then reset to the address of the storage location within the memory 26 associated with the first character of the first data line. The sequence just described is then repeated except that the character generator 33 is operated, under the control of the generator 29, to cause the video signal for the second scan line to be supplied by the converter 35. At the end of that line, the address counter 31 is reset as before and the sequence repeated for each subsequent scan line to enable the complete data line to be displayed.

When the first data line has been completely displayed as far as one field is concerned, the address store 28 is again incremented by a signal from the generator 25 so as then to address the storage location of the memory 26 associated with the first character of the second data line. Display of the second data line proceeds in a similar manner to that as described above in respect of the first data line and this, in turn, is followed in the same way by display of the other data lines to make up the complete page. (It will be appreciated that the requirement of being able to proceed from addressing storage locations within the memory in respect of information in respect of one data line to that in respect of the next data line merely by incrementing the counter 31 places a constraint on the storage locations used for each data line.)

After display of the last data line of the page, there is a short pause, corresponding to the normal field flyback period, and then the whole display sequence is restarted for the next field, commencing with the first character of the first data line, and so on.

It will be appreciated that there is no conflict in addressing the random access memory 26 for writing and reading. These two operations necessarily occur at different times, reading only taking place during scanning of each display field while writing only occurs in the field blanking intervals.

Although the invention has been described above in its application to a monochrome television receiver, it may equally be used with a colour receiver. In that case, if the data display is only required in monochrome, operation of the switch 2 to its data display position (as shown in the drawing) may cause the three chrominance signals of the receiver to be preset to appropriate values. Alternately, if the data display is required to have more than one colour, the information transmitted in respect of each character may include a colour component which is arranged to be stored in the memory 26 along with the character identity and subsequently processed, on read out from the memory 26, to control the chrominance signals for display of the character in the appropriate colour. Preferably the extra colour information, for example in respect of a complete data line, is transmitted in the line scan period that contains the page address.

Although in the example described above the information transmitted in each line scan period that is associated with data for display includes the data line address (or a corresponding address to signify that the line scan period contains a page address), such addresses are not essential. If data line addresses are not transmitted, the receiving system may be provided with a data line counter which is reset at the begining of a page transmission and subsequently incremented as information in respect of each data line is received, this counter being utilised during receipt of each line scan period containing information characterising a data line to indicate to the address store 28 the storage location within the memory 26 at which writing is to commence for the data line in question. It is also necessary for the detector 19 to be modified to detect some other characteristic of the transmission during each line scan period that contains a page address. The characteristic used for this purpose may be a change in the start code, for example '001' in place of the '110' used in other line scan periods.

It is also to be understood that the concept of divorcing the page address from the data to be displayed is not restricted to systems for handling a television signal in which each data line is signalled in a single line scan period. Alternatively, two line scan periods (preferably in successive fields may be utilised for signalling the information associated with each data line, the page address being signalled in a preceding line scan period as previously.

If the receiver equipment hereinbefore described is a separate unit from the conventional television receiver used for presenting the data display, there may be provision for superimposing on to a suitable carrier the signals to be utilised for controlling the cathode ray tube beam during each line scan while data is being displayed. In this case the modulated carrier may be passed direct to the aerial input socket of the receiver so as to enable data to be displayed without any modification of the television receiver.

Although it has been assumed that the data to be displayed is of alpha-numeric form, it may alternatively be of graphical form (e.g., a drawing). For this purpose it is merely necessary to provide a second read-only memory that is used solely for graphic displays, this second memory being brought into use in place of the one previously considered upon receipt of the appropriate special instruction to which reference has previously been made.

Figure 2:
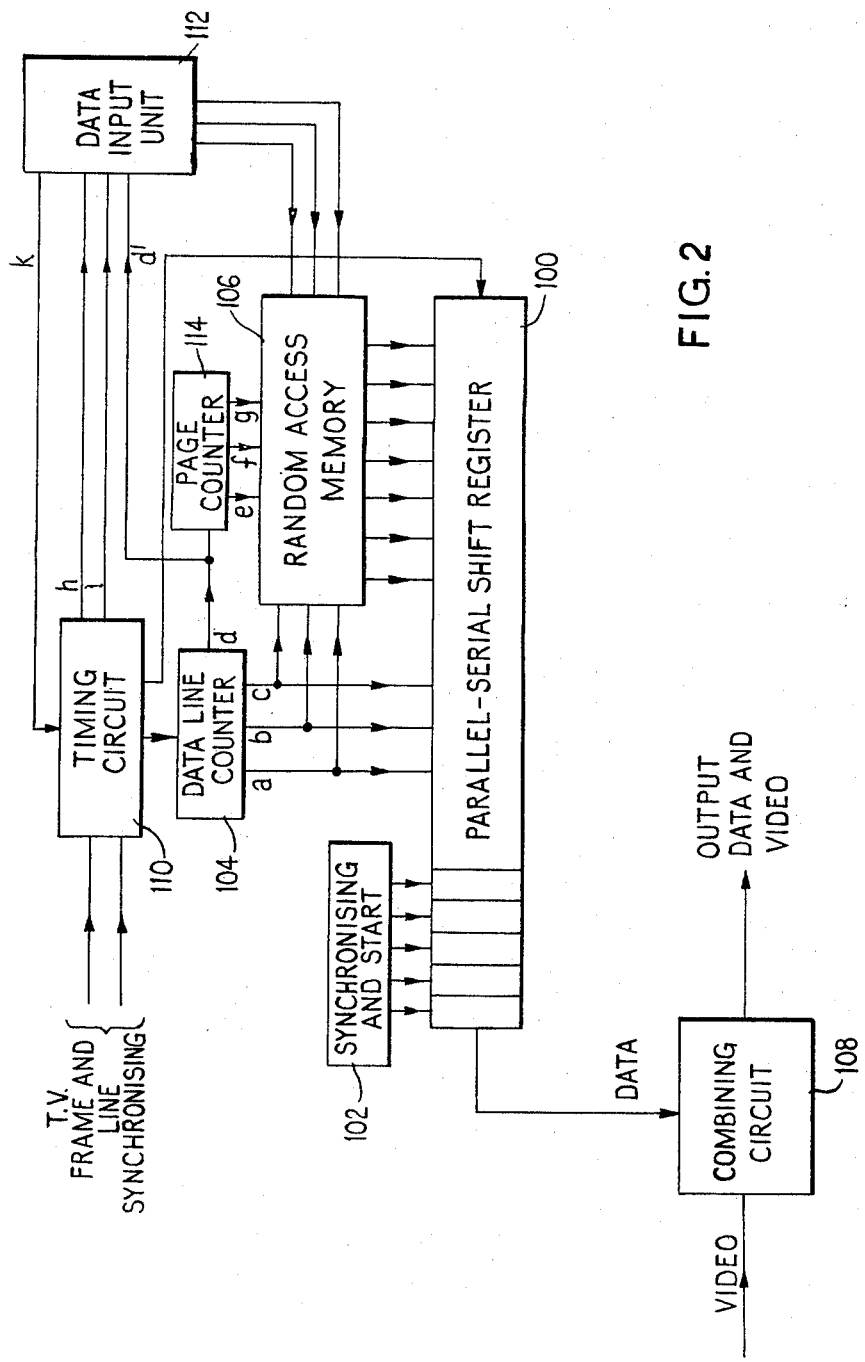
FIG. 2 shows diagrammatically one possible form of transmitter.

Referring now to FIG. 2, there is shown in block diagrammatic form one possible form of data insertion apparatus suitable for the production and subsequent transmission of data and video signals to be received by the receiver of FIG. 1.

The data insertion apparatus comprises a parallel-serial shift register 100 and connected to feed information in parallel into this parallel-serial shift register 100 are a synchronising and start signal circuit 102, a data line 104 and a random access memory 106. Connected to receive the serial output of the register 100 is a two-way combining circuit 108, the output of stored data to this multiplexer being controlled by a timing circuit 110, which is synchronised to the television line and frame signals, and which also synchronises the data line 104 and a data input unit 112. The combining circuit 108 combines the output of the register 100 (when present) with the normal video signals, the timing circuit 110 ensuring that data from the register 100 is present at the correct time during the vertical blanking interval. A page counter 114 is connected to an output of the data line counter 104, the output of the page counter 114 and the output of the data line counter 104 being used to address the random access memory 106 for reading information out of the memory into the register 100. Alternatively, for writing information in to the random access memory 106 the memory is addressed using the output of the data line counter 104, the output of the page and the input data being obtained from the data input unit 112.

The operation of the circuit will now be described with reference to the transmission of a single page of data of 24 lines selected from 31 possible pages stored in the random access memory 106. The method of transmission is that the pages are transmitted cyclically in a continuous manner so that the receiver can receive any page over a short period of time. Thus the number of the page transmitted is immaterial to the description and so therefore is the count in the page 114.

For the transmission of any page therefore the following sequence takes place: Firstly the data line counter is set to give an output signifying the first line, it having been reset to this by the transmission of the last line of the previous page. The synchronising and start signals are input into the register 100 from the circuit 102 which is for example a hard wired circuit to produce the desired sequences. The outputs of the data line counter $a$, $b$, $c$ are stored in the register 100 to identify the line being transmitted. The output $d$ of the divider 104 has previously set the page divider 114 to a page number identified by the outputs $e, f, g$. The outputs $a, b, c$ of divider 104 and $e, f, g$ of divider 114 address a line of data stored in the memory 106 and that line of data is placed in the register 100 as shown. The register 100 is then full of the required information required for transmission during the vertical blanking interval. The storage of this required information may take place during the time that the video signal is being transmitted. Thus after the transmission of the video signal from the multiplexer 108 to the power transmitter and aerial (not shown) and under the control of the timing circuit the information in the register 100 is transferred serially to the multiplexer for output to the power transmitter and aerial, the register 100 then being cleared of information.

The timing circuit then steps the output of the data line counter on one position but no output is given to the line $d$ so that count in the page counter remains the same. Thus by a similar process the information for the next line is addressed, recorded in the register 100 and transferred to the output transmitter and aerial via the multiplexer 108.

The maximum number of lines is 24 and when the counter reaches 24 or a lower preset number it is reset to its initial position and an output appears on line $d$ so that the page counter is incremented thus enabling the lines of the next page to be transmitted sequentially. After several sequencies the page counter will reach a maximum and will be reset to an initial position so ensuring a complete cyclical transmission of all pages.

The first line of each page is called the page header and contains as explained hereinbefore the page number and other data. These lines are stored in the memory 106, special circuitry being included if any continuous up dating of the information is required, as for example in the transmission of the correct time.

The data line information stored in the memory 106 can be changed by addressing the memory using counters 106 can be changed by addressing the memory using counters 104 and 114 and writing in information using the data input unit 112 which may for example be a keyboard unit. Synchronisation of the writing processed is ensured by leads $h, i$ and $d^1$ from timing circuit 110 and counter 104 and by lead $k$ from the input data unit 112 to the timing circuit 110 which lead can be used to set the counters 104 and 114 to required positions.

What I claim is:

1. A combined television/data transmission system for a television signal in which information characterizing a page of data to be displayed is digitally coded and transmitted in line scan periods that do not have picture information, in which each said page of data comprises a number of rows of data, each page of data being transmitted by transmitting a respective page address in a first said line scan period that does not have picture information, one or more subsequent periods of said line scan periods being utilized to transmit information relating to said rows of data, the information transmitted during each subsequent line scan period relating to a complete row of data in said respective page and containing in addition the row address in digitally coded form but not said respective page address, the end of transmission of a page of data being identified by a further one of said line scan periods in which a further page address is transmitted.

2. A combined television/data system as claimed in claim 1 in which in a line scan period in which a page address is signalled a synchronizing signal is transmitted followed by a start signal prior to transmitting the page address signal and in which in a line scan period in which a row of data is signalled a synchronising signal is transmitted followed by a start signal prior to transmitting the row address signal.

3. A combined television/data transmission system as claimed in claim 1 in which during said first line scan period subsequent to said transmission of said page address digital coded signals relating to auxiliary information are transmitted.

4. A combined television/data transmission system as claimed in claim 3 in which the correct time is transmitted as said auxiliary information.

5. A combined television/data system as claimed in claim 1 in which the information for display is in alphanumeric form.

6. A combined television/data system as claimed in claim 1 in which the information for display is in graphical form.

7. A transmitter for a combined television/data system in which information characterizing a page of data to be displayed is digitally coded and transmitted in television line scan periods that do not have picture information in which each page of data comprises a number of rows of data, each page of data being transmitted by transmitting a respective page address in a first said line scan period that does not have picture information, one or more subsequent periods of said line scan periods being utilized to transmit information relating to said rows of data, the information transmitted during each subsequent line scan period relating to a complete row of data in said respective page and containing in addition the row address in digitally coded form but not said respective page address, the end of transmission of a page of data being identified by a further one of said line scan periods in which a further page address is transmitted, said transmitter including A. line and frame synchronizing means to synchronize the transmission of the television video signals on a suitable video carrier frequency signal, B. a timing circuit to synchronize transmission of data signals during one or more specified line scan periods during the vertical blanking interval of said television video signals, C. a parallel-to-serial shift register into which data to be transmitted is fed in parallel, D. a page counter, E. a row counter controlled by said timing circuit, F. a random access memory, the outputs of said page and line counters being used to address associated portions of said random access memory, the information from said memory being stored in a part of said register, G. a synchronizing and start circuit being connected to feed synchronizing and start signals into a further part of said register, H. a combining circuit, said information in said register being combined with said video carrier frequency signal in said combining circuit under the control of said timing circuit to produce an output data signal during one or more specified line scan periods during said vertical blanking interval, in which in each portion of said memory associated with the first row of each page the page address is stored in digital form together with auxiliary information in digital form and in which in the portions of said memory associated with the subsequent rows of each page the row address is stored in digital form together with the data contained in each respective row in digital form, and in which the information contained in the associated portions of said memory is transferred to said register under the control of said page and line counters for transmission during said first and said subsequent line scan periods.

* * * * *